United States Patent [19]

Colanzi et al.

[11] Patent Number: 4,669,895
[45] Date of Patent: Jun. 2, 1987

[54] SEALING UNIT FOR MUTUALLY ROTATING MEMBERS

[75] Inventors: Franco Colanzi; Angelo Vignotto, both of Turin, Italy

[73] Assignee: RIV-SKF Officine Di Villar Perosa S.p.A., Italy

[21] Appl. No.: 849,416

[22] Filed: Apr. 8, 1986

[30] Foreign Application Priority Data

Apr. 19, 1985 [IT] Italy .................. 53275/85[U]

[51] Int. Cl.⁴ .................. F16C 33/72; F16C 33/76; F16C 33/78
[52] U.S. Cl. .................. 384/477; 384/478; 384/486
[58] Field of Search .................. 384/477–482, 384/484–488, 147–151

[56] References Cited

U.S. PATENT DOCUMENTS

| | | | |
|---|---|---|---|
| 2,251,012 | 7/1941 | Delaval-Crow | 384/477 X |
| 3,510,138 | 5/1970 | Bowen et al. | 384/478 X |
| 4,516,783 | 5/1985 | Mitsue et al. | 384/485 X |

FOREIGN PATENT DOCUMENTS

| | | | |
|---|---|---|---|
| 7832 | 2/1980 | European Pat. Off. | 384/477 |
| 65887 | 12/1982 | European Pat. Off. | 384/486 |
| 2510221 | 1/1983 | France | 384/486 |
| 2030236 | 4/1980 | United Kingdom | 384/484 |
| 2130310 | 5/1984 | United Kingdom | 384/486 |

Primary Examiner—Stuart S. Levy
Assistant Examiner—Thomas R. Hannon
Attorney, Agent, or Firm—Steele, Gould & Fried

[57] ABSTRACT

A sealing unit comprises two rigid, face-to-face shields, one of which is provided with an annular elastomeric member exerting sliding radial sealing pressure on a track of the other shield. The other shield is provided with a radially-outer edge bent in such a manner as to define, on a front outer surface of the shield, a concavity, and, on an inner surface, a corresponding convexity cooperating with an axial annular rib on the elastomeric member, for defining a further seal.

6 Claims, 2 Drawing Figures

SEALING UNIT FOR MUTUALLY ROTATING MEMBERS

BACKGROUND AND SUMMARY OF THE INVENTION

The invention relates to a seals for mutually rotating members, and in particular, to a two-part sealing unit, one of which parts is provided with a sliding elastomeric sealing member and the other of which parts forms a sliding track for the sealing member.

It is an object of the invention to provide a sealing unit for mutually rotating members, such as roller bearing assemblies, which exhibits improved sealing against entry of external contaminants and loss of lubricating grease, as compared with known sealing units, while at the same time involving no substantial increase in production cost. This and other objects of the invention are accomplished by a sealing unit designed for insertion between two mutually-rotating members, particularly rolling bearings, and comprising: a first rigid shield designed to fit onto one of said members; a second rigid shield designed to fit onto the other of said members; an annular sealing member affixed to said second shield and made of elastomeric material. The sealing member is designed to cooperate, in sliding manner, with a respective sliding track formed on said first shield, for exerting radial sealing action on said first shield. The first shield comprises a radial flange portion facing said annular elastomeric member and having a peripheral annular edge bent in such a manner as to define an annular concavity on a front outer surface of said first shield, opposite said second shield, and, on an inner surface of said first shield, opposite said outer surface, a convexity defined on the radially-outermost side by an oblique surface diverging relative to said second shield.

BRIEF DESCRIPTION OF THE DRAWINGS

The invention will be described by way of examples with reference to the attached drawing in which.

DETAILED DESCRIPTION OF THE PREFERRED EMBODIMENTS

Figure 1:
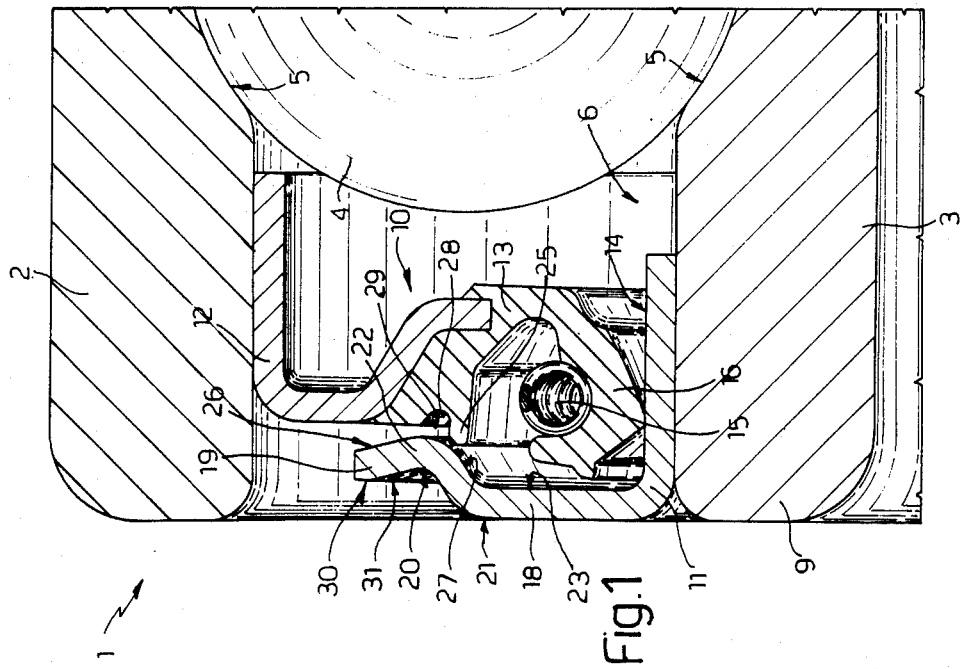
FIG. 1 is a section view of part of a rolling bearing provided with a sealing unit according to the teachings of the present invention.

FIG. 1 illustrates a rolling bearing 1 of any known type comprising an outer ring 2, an inner ring 3, and rolling bodies 4 rolling in tracks 5 of rings 2 and 3 which are thus free to mutually rotate. A sealing unit 10 is inserted between rings 2 and 3 for closing bearing 1, and in particular, cavity 6 of bearing 1. The sealing unit 10 comprises: a first rigid shield 11 designed to fit onto one of said rings, e.g. ring 3; a second shield 12 designed to fit onto the other ring, e.g. ring 2, facing and concentric with shield 11; and an annular sealing member 13 affixed to one of said shields, preferably shield 12. Sealing member 13 is designed to cooperate, in sliding and fluid-tight manner, with a respective track 14 of the other shield, preferably shield 11. Shield 12 is designed so as to be mounted inside cavity 6 on the rolling body 4 side and so define the inner member of unit 10, whereas shield 11 is designed so as to be mounted at and flush with a respective end 9 of ring 3 and so define the outer closing member of unit 10. Shields 11 and 12 are preferably made of metal and are substantially rigid, whereas member 13 is made of elastomeric material, such as rubber, and exerts radial sealing pressure between shields 12 and 11 and on track 14 of shield 11. Member 13 is of known general design and secured in projecting manner, by means of bonding during curing, to a center portion of shield 12, in the form of a truncated-cone sleeve. Member 13 is also preferably provided with a known type of helical spring 15 forming part of unit 10, wound annularly onto member 13, and preloaded so as to exert preset pressure for thrusting an appendix 16 of V-shaped member 13 against track 14 and so increase the sealing pressure normally exerted by member 13 on the inner surfaces of shield 11 subsequent to flexing caused by known interference between shield 11 and appendix 16 during operation of unit 10.

In accordance with the present invention, shield 11 comprises a radial flange portion 18 facing member 13 and comprising a peripheral annular edge 19 bent so as to define peripherally, on flange 18, an annular concavity 20 on a front outer surface 21 of shield 11 facing the opposite way to shield 12, and a convexity or annular boss 22 on an inner surface 23 of shield 11 opposite surface 21. Member 13 further comprises an annular rib 25 extending axially towards convexity 22 and designed to cooperate with convexity 22 for exerting supplementary sealing pressure. In more detail, convexity or boss 22 is defined, on the radially-outermost side, by an oblique surface 26 diverging relative to and facing shield 12. In accordance with the embodiment shown, rib 25 cooperates in non-sliding manner with a curved surface 27 of shield 11 defining part of inner surface 23 and defining, on the radially-innermost side, convexity 22, so as to define, together with convexity 22, a labyrinth seal. For further improving sealing action against external contaminants, member 13 is also provided with an annular groove 28 formed adjacent to and further outwardly radially relative to rib 25, and facing the top of convexity or boss 22 at the tip; joining surfaces 26 and 27 and defining convexity or boss 22. On its radially-outermost side, groove 28 is defined by an oblique surface 29 facing surface 26 and inclined at such an angle as to substantially converge with surface 26.

Concavity 20, on the other hand, is defined on its radially-outermost side by a right-angled edge 30 substantially forming a sharp edge which, by virtue of the shape of edge 19, lies in a plane displaced axially towards inner shield 12 relative to the plane containing surface 21. An oblique surface 31, adjacent to edge 30 and parallel with opposite surface 26, laterally defines concavity 20 and is designed to spin contaminants outwards of cavity 6.

The sealing unit as described above operates as follows. When shields 11 and 12 are mounted facing each other, taking care to mount the shield, with flange 18, onto an operatively-rotating member, member 13 mates with track 14 and rib 25 cooperates with convexity or boss 22, so as to define a double axial-radial seal. Member 13 exerts sliding radial sealing pressure, in known manner, preventing leakage of lubricating grease from cavity 6. Such sealing action is in itself improved relative to certain known sealing units, in that, by virtue of the second (axial) seal, member 13 may itself be kept lubricated with special grease inserted inside the annular chamber defined by appendix 16, flange 18 and rib 25. Thanks to the special design of the cooperating members, however, the second seal provides for considerably greater efficiency as compared with that of similar known sealing units, in that, as tests have shown, the special grease is held better and longer, thus ensuring greater sealing efficiency and longer working life than on known sealing units. In fact, the curved design of surface 27, together with groove 28, enables grease to be accumulated, in use, at rib 25, which arrests the remaining grease inside the chamber and prevents the entry of contaminants. Most of such contaminants are spun away from unit 10, by virtue of concavity 20 which, as has surprisingly been shown, increases the centrifugal effect normally achieved using flanges such as 18, but with flat edges. The few contaminants managing to get past the aforementioned barrier are collected in groove 28, from which they are sucked in by convexity 22, by virtue of the design of surface 29, are spun along surface 26 (in use, shield 11 turns together with member 3) and are collected on edge 30 which, by virtue of its design, aids the formation and detachment of drops, thus enabling complete disposal of any contaminants not disposed of previously.

Figure 2:
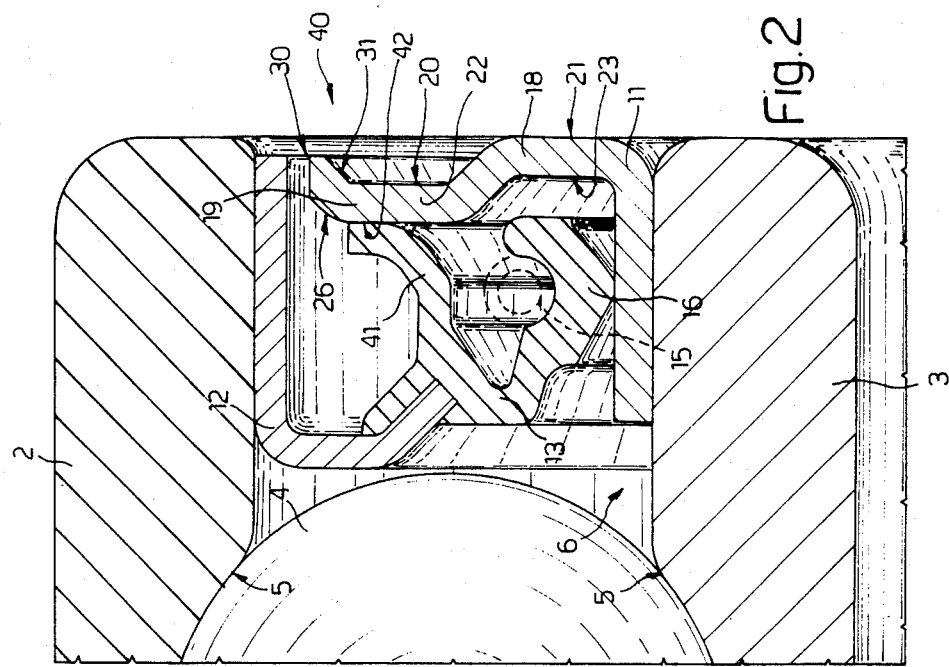
FIG. 2 is a section view of the specularly symmetrical part of the bearing in FIG. 1, but with an alternative embodiment of the sealing unit.

FIG. 2 shows a variation 40 of the sealing unit according to the present invention, which differs from the unit already described only as to a number of details. For the sake of simplicity, parts similar or identical to those already described are indicated with the same reference numerals. Sealing unit 40 differs from unit 10 in that it comprises an axial annular rib 41 of greater length and shaped differently from rib 25, rib 41 cooperating in use and in sliding manner with a flat surface 42 defining part of inner surface 23 and the top of convexity or boss 22. Interference between the convexity or boss 22 and rib 41 is such that, with shields 11 and 12 mated, rib 41 is flexed radially outwards, as shown in FIG. 2, in such a manner as to define a sliding axial seal between shields 11 and 12, and to curve in such a manner as to substantially blend with oblique surface 26 and so assist in contaminant centrifugation. Due to the greater efficiency of a sliding seal as compared with a labyrinth seal, groove 28 is dispensed with on unit 40, as is surface 27, which is replaced by surface 42. Surface 26, edge 30 and concavity 20, however, are also provided on unit 40 and perform the same functions as an unit 10. Sealing unit 40 therefore operates in exactly the same way as unit 10, except for the function performed by groove 28 which, on unit 40, may be dispensed with by converting the non-sliding supplementary axial seal into a sliding seal. This results in a sealing unit of equal or greater efficiency as compared with unit 10, and of much simpler design, but involving greater friction. The technician may therefore choose, in each individual case, which of units 10 or 40 is the better suited to the application in question, without, however, departing from the scope of the present invention.

The advantages of the present invention will be clear from the foregoing description, as will the possibility of employing the present invention for applications other than bearings. The sealing unit according to the present invention may, in fact, be inserted between any two mutually-rotating members, such as a shaft and respective seat, in which case, performance is exactly the same as described herein.

What is claimed is:

1. A sealing unit adapted for insertion between two mutually rotating members, the unit comprising:
    a first rigid shield defining a sliding track and adapted to fit onto one of two mutually rotating members;
    a second rigid shield adapted to fit onto the other of said rotating members;
    an annular elastomeric sealing member affixed to said second shield and adapted to slidingly engage said sliding track and exert a radial sealing pressure; and,
    a radial flange portion on said first rigid shield, having an inner surface facing said annular elastomeric sealing member and an outer surface opposite said inner surface, said flange portion having a peripheral annular edge bent to define, peripherally:
    an annular concavity on said outer surface opposite said second shield, said annular concavity being limited on its radially-outermost side by a right-angled substantially sharp edge lying in a plane displaced axially toward said second shield relative to a plane defined by said outer surface; and,
    an annular convexity on said inner surface, said annular convexity being limited on its radially-outermost side by an oblique surface diverging relative to and facing said second shield,
    whereby lubricating materials are retained interiorly of said annular sealing member and contaminants are deflected by and ejected from said shields.

2. A sealing unit as claimed in claim 1, wherein said annular elastomeric member comprises an annular rib extending axially towards said convexity, said rib cooperating with said convexity for exerting supplementary sealing pressure to retain supplementary lubricating materials for said annular sealing member.

3. A sealing unit as claimed in claim 2, wherein said axial annular rib on said elastomeric member cooperates, in non-sliding manner, with a curved surface of said inner surface of said first shield defining said convexity on the radially-innermost side, said annular rib and said convexity defining a labyrinth seal.

4. A sealing unit as claimed in claim 2, wherein said axial annular rib on said elastomeric member cooperates, in sliding manner, with a flat surface of said inner surface of said first shield defining a top of said convexity, whereby said rib is flexed radially outwards by said convexity and exerts an axial sealing force between said first and said second shield.

5. A sealing unit as claimed in claim 3, wherein said elastomeric sealing member comprises an annular groove disposed at a tip of said oblique and curved surfaces and adjacent to said rib, said groove defined on its radially-outermost side by another oblique surface facing said convexity.

6. A sealing unit as claimed in claim 1, further coprising a helical spring wound annularly about said sealing member, for increasing the pressure exerted by said sealing member on the respective surfaces of said first shield.

* * * * *